United States Patent
Moon

(10) Patent No.: US 10,325,549 B2
(45) Date of Patent: Jun. 18, 2019

(54) DISPLAY DEVICE, DRIVING METHOD THEREOF, AND IMAGE DISPLAY SYSTEM

(71) Applicant: Samsung Display Co., Ltd., Yongin-si, Gyeonggi-do (KR)

(72) Inventor: Kyunghwan Moon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/434,535

(22) Filed: Feb. 16, 2017

(65) Prior Publication Data

US 2017/0243531 A1    Aug. 24, 2017

(30) Foreign Application Priority Data

Feb. 23, 2016 (KR) .................. 10-2016-0021379

(51) Int. Cl.
*G09G 3/20* (2006.01)
*G06F 1/3234* (2019.01)

(52) U.S. Cl.
CPC ......... *G09G 3/2092* (2013.01); *G06F 1/3265* (2013.01); *G09G 2320/0285* (2013.01); *G09G 2340/0407* (2013.01)

(58) Field of Classification Search
None
See application file for complete search history.

(56) References Cited

U.S. PATENT DOCUMENTS

| | | | |
|---|---|---|---|
| 2008/0211794 A1* | 9/2008 | Yi | G09G 3/3648 345/204 |
| 2014/0168197 A1* | 6/2014 | Kobayashi | G09G 3/2096 345/212 |

FOREIGN PATENT DOCUMENTS

| | | |
|---|---|---|
| KR | 10-2004-0039962 | 5/2004 |
| KR | 10-0946008 | 3/2010 |
| KR | 10-2013-0025228 | 3/2013 |
| KR | 10-1263531 | 5/2013 |
| KR | 10-2014-0111736 | 9/2014 |
| KR | 10-1469480 | 12/2014 |
| KR | 10-2015-0073482 | 7/2015 |
| KR | 10-2015-0094766 | 8/2015 |

* cited by examiner

*Primary Examiner* — Joseph R Haley
(74) *Attorney, Agent, or Firm* — Lewis Roca Rothgerber Christie LLP

(57) ABSTRACT

A driving method of a display device includes: receiving a partial display signal from a graphic controller; detecting partial resolution information from the partial display signal; determining a number of activation data lanes from among a plurality of data lanes based on the partial resolution information; generating a lane control signal including information on the number of activation data lanes; outputting the lane control signal to the graphic controller; and receiving image data through the activation data lanes from among the plurality of data lanes from the graphic controller.

20 Claims, 11 Drawing Sheets

1

DISPLAY DEVICE, DRIVING METHOD THEREOF, AND IMAGE DISPLAY SYSTEM

CROSS-REFERENCE TO RELATED APPLICATION

This patent application claims priority to and the benefit of Korean Patent Application No. 10-2016-0021379, under 35 U.S.C. § 119, filed on Feb. 23, 2016, the entire content of which is hereby incorporated by reference.

BACKGROUND

1. Field

One or more example embodiments of the present disclosure relate to a display device, a method of driving the same, and an image display system.

2. Description of the Related Art

As replacements for conventional cathode-ray tubes, display devices such as liquid crystal display devices, electrophoretic display devices, and organic light emitting display devices have been widely utilized. A display device may include a display panel, a gate driver, a data driver, and a timing controller. The timing controller may receive image data and control signals from an external graphic control unit.

SUMMARY

One or more example embodiments of the present disclosure provide a display device that may be driven with a low-power, a method of driving the same, and an image display system.

According to an example embodiment of the inventive concept, a driving method of a display device includes: receiving a partial display signal from a graphic controller; detecting partial resolution information from the partial display signal; determining a number of activation data lanes from among a plurality of data lanes based on the partial resolution information; generating a lane control signal including information on the number of activation data lanes; outputting the lane control signal to the graphic controller; and receiving image data through the activation data lanes from among the plurality of data lanes from the graphic controller.

In an example embodiment, the determining of the number of activation data lanes may include: calculating a ratio of a partial resolution to an entire resolution; calculating a first value by multiplying the ratio by an entire number of the plurality of data lanes; and calculating the number of the activation data lanes by rounding up the first value to the nearest integer.

In an example embodiment, the determining of the number of the activation data lanes may include: calculating a data rate for a partial display image implementation based on the partial resolution information; calculating a first value by dividing the data rate by a speed of one data lane from among the plurality of data lanes; and calculating the number of the activation data lanes by rounding up the first value to the nearest integer.

In an example embodiment, the determining of the number of the activation data lanes may include: determining an address value corresponding to the partial resolution information based on the partial resolution information; and reading the number of the activation data lanes corresponding to the address value from a lookup table.

In an example embodiment, the method may further include adjusting a frame rate for a number of frames displayed for 1 second.

In an example embodiment, the method may further include determining the number of the activation data lanes after adjusting the frame rate for the number of frames displayed for 1 second.

In an example embodiment, the method may further include receiving one of a first mode selection signal corresponding to a still image mode or a second mode selection signal corresponding to a video mode from the graphic controller, and when the second mode selection signal is received, the image data is received from the graphic controller.

According to an example embodiment of the inventive concept, a display device includes: a timing controller configured to receive a partial display signal including partial resolution information from a graphic controller through one of a plurality of data lanes, and to determine a number of activation data lanes from among the plurality of data lanes based on the partial resolution information; and a display panel configured to be controlled by the timing controller, wherein the timing controller is further configured to generate a lane control signal including information on the number of the activation data lanes, to output the generated lane control signal to the graphic controller, and to receive image data from the graphic controller through the activation data lanes.

In an example embodiment, the timing controller may be configured to calculate a ratio of a partial resolution to an entire resolution, to calculate a first value by multiplying the ratio by an entire number of the plurality of data lanes, and to round up the first value to the nearest integer to determine the number of the activation data lanes.

In an example embodiment, the timing controller may be configured to calculate a data rate for a partial display image implementation based on the partial resolution information, to calculate a first value by dividing the data rate by a speed of one data lane from among the plurality of data lanes, and to determine the number of the activation data lanes by rounding up the first value to the nearest integer.

In an example embodiment, the timing controller may be configured to calculate the data rate after adjusting a number of frames displayed for 1 second.

In an example embodiment, the timing controller may be configured to determine an address value corresponding to the partial resolution information, and to read the number of the activation data lanes corresponding to the address value from a lookup table to determine the number of the activation data lanes.

In an example embodiment, the timing controller may be configured to receive a mode selection signal from the graphic controller including information on one of a first mode corresponding to a still image mode or a second mode corresponding to a video mode, and the timing controller may be configured to receive the image data from the graphic controller when the mode selection signal including the information on the second mode is received.

In an example embodiment, at least one of the plurality of data lanes may be a two-way communication lane configured to deliver a signal from the graphic controller to the timing controller and from the timing controller to the graphic controller.

According to an example embodiment of the inventive concept, an image display system includes: a display panel including a plurality of data lines, a plurality of gate lines, and a plurality of pixels; a graphic controller configured to output image data, and a partial display signal including partial resolution information; a timing controller connected to the graphic controller through a plurality of data lanes, the timing controller being configured to receive the image data and the partial display signal, and to output a gate control signal, a data control signal, and converted image data; a gate driver configured to generate a gate signal based on the gate control signal, and to output the gate signal to the gate lines; and a data driver configured to output a data voltage to the data lines, the data voltage being obtained by converting the converted image data based on the data control signal, wherein the timing controller includes an image data receiver configured to determine a number of activation data lanes from among the plurality of data lanes based on the partial resolution information, to generate a lane control signal including information on the number of the activation data lanes, and to receive the image data through the activation data lanes.

In an example embodiment, the graphic controller may include: a central processor configured to generate the image data; and an image data split transmitter configured to receive the image data from the central processor, to split the image data according to the lane control signal received from the image data receiver, and to output the split image data through the activation data lanes.

In an example embodiment, the graphic controller may further include a mode selector configured to compare first frame image data corresponding to an nth frame and second frame image data corresponding to an n+1th frame, where n is an integer greater than or equal to one, according to the image data received from the central processor, to generate a mode selection signal including information on one of a first mode corresponding to a still image mode or a second mode corresponding to a video mode, and to output the mode selection signal to the image data split transmitter and to the image data receiver, wherein the image data split transmitter may be configured to stop operating when the mode selection signal including the information on the first mode is received, and to provide the image data to the timing controller when the mode selection signal including the information on the second mode is received.

In an example embodiment, the image data receiver may be configured to calculate a ratio of a partial resolution to an entire resolution, to calculate a first value by multiplying the ratio by an entire number of the plurality of data lanes, and to round up the first value to the nearest integer to calculate the number of the activation data lanes.

In an example embodiment, the image data receiver may be configured to calculate a data rate for a partial display image implementation based on the partial resolution information, to calculate a first value by dividing the data rate by a speed of one data lane from among the plurality of data lanes, and to calculate the number of the activation data lanes by rounding up the first value to the nearest integer.

In an example embodiment, the image data receiver may be configured to determine an address value corresponding to the partial resolution information based on the partial resolution information, and to read the number of the activation data lanes corresponding to the address value from a lookup table.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept, and together with the description, serve to explain aspects and features of the inventive concept. In the drawings.

DETAILED DESCRIPTION

Figure 1:
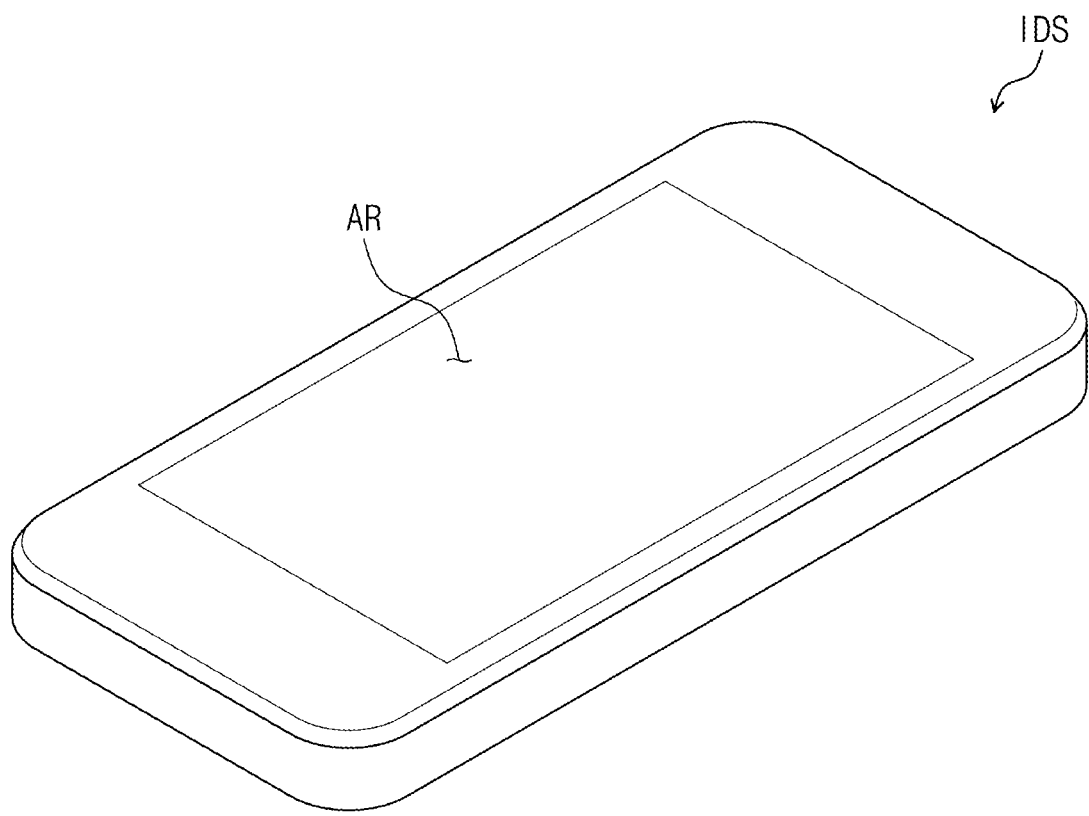
FIG. 1 is a perspective view of an image display system according to an embodiment of the inventive concept.

Hereinafter, example embodiments will be described in more detail with reference to the accompanying drawings. The present inventive concept, however, may be embodied in various different forms, and should not be construed as being limited to only the illustrated embodiments herein. Rather, these embodiments are provided as examples so that this disclosure will be thorough and complete, and will fully convey the aspects and features of the inventive concept to those skilled in the art. Accordingly, processes, elements, and techniques that are not necessary to those having ordinary skill in the art for a complete understanding of the aspects and features of the inventive concept may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the inventive concept.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
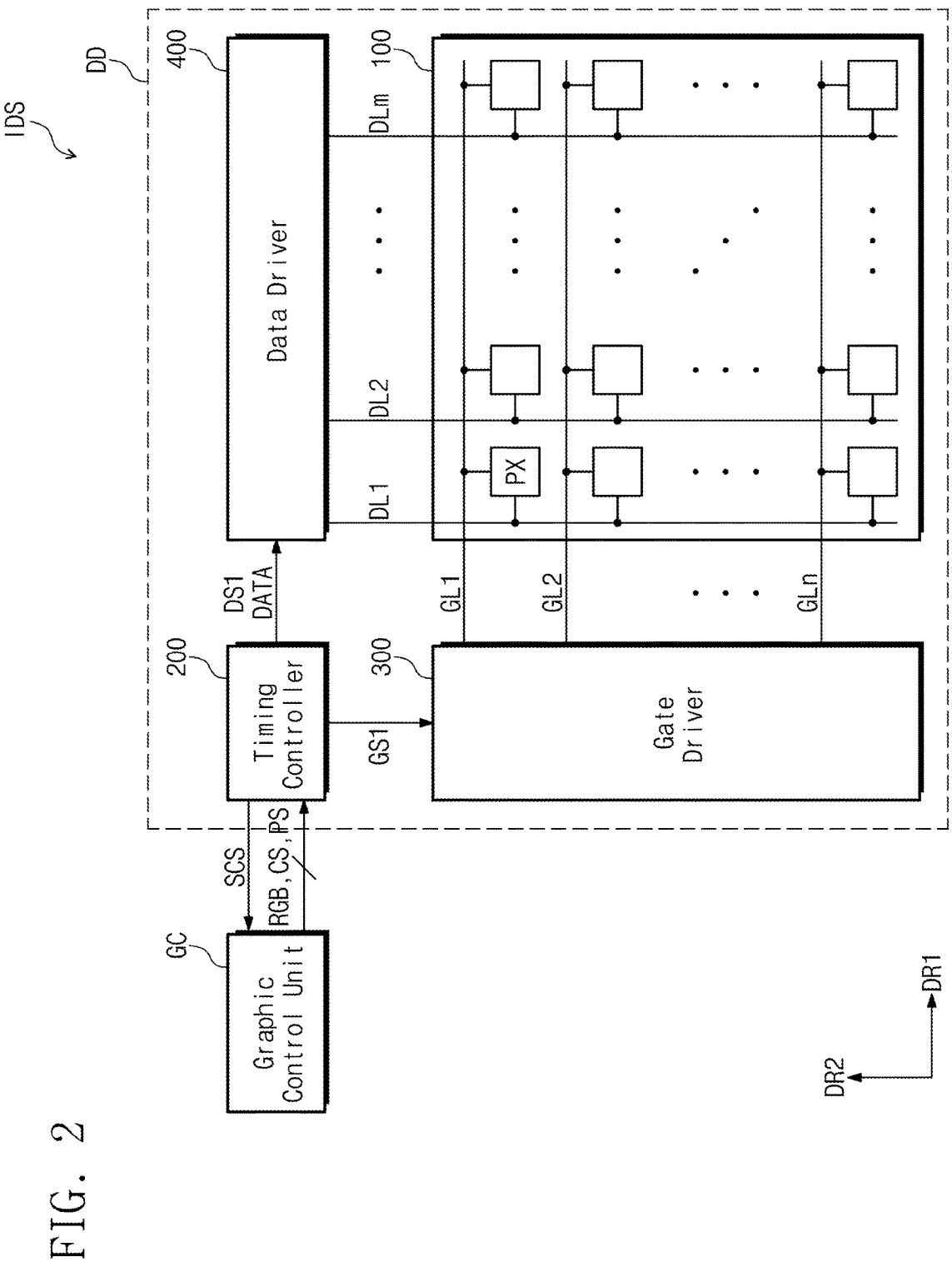
FIG. 2 is a schematic block diagram of an image display system according to an embodiment of the inventive concept.

FIG. 1 is a perspective view of an image display system according to an embodiment of the inventive concept, and FIG. 2 is a schematic block diagram of an image display system according to an embodiment of the inventive concept.

Referring to FIGS. 1 and 2, a flat portable terminal is exemplarily illustrated as one example of an image display system IDS according to an embodiment of the inventive concept. However, the inventive concept is not limited thereto, and the image display system IDS may be, for example, a small or medium-sized image display system, such as a television, a notebook computer, an integrated computer, a center information display (CID) provided to a vehicle, a wristwatch type electronic device, a personal digital assistant (PDA), a portable multimedia player (PMP), a game console, a tablet PC, a smartphone, a vehicle navigation unit, and/or a camera. These examples are simply given as suggestions, but the inventive concept herein may be employed in other electronic devices without departing from the spirit and scope of the inventive concept.

According to an example embodiment, the image display system IDS may include a display device DD and a graphic control unit (e.g., a graphic controller) GC.

The display device DD may include a display panel 100, a timing controller 200, a gate driver 300, and a data driver 400.

The display panel 100 may display an image at (or through) a display area AR. The display panel 100 may be any one of various suitable display panels, such as an organic light emitting display panel, a liquid crystal display panel, a plasma display panel, an electrophoretic display panel, or an electrowetting display panel.

The display panel 100 may include a plurality of data lines DL1 to DLm, a plurality of gate lines GL1 to GLn, and a plurality of pixels PX.

The plurality of gate lines GL1 to GLn may extend in a first direction DR1, and the plurality of data lines DL1 to DLm may extend in a second direction DR2 crossing the first direction DR1. The plurality of data lines DL1 to DLm and the plurality of gate lines GL1 to GLn define pixel areas, and a pixel PX for displaying an image may be provided in each of the pixel areas.

FIG. 1 shows a pixel PX connected to the first data line DL1 and the first gate line GL1 as one example. The pixel PX may display one of primary colors or one of mixed colors. The primary colors may include various colors such as red, green, blue, and white, and the mixed colors may include various colors such as yellow, cyan, and magenta. However, the inventive concept is not limited thereto.

The timing controller 200 receives a control signal CS, a partial display signal PS, and image data RGB from the graphic control unit GC outside (e.g., external to) the display device DD.

The control signal CS may include a vertical sync signal that is a frame distinction signal, a horizontal sync signal that is a row distinction signal, a data enable signal for identifying an area (or zone) on the display area where data is to be transmitted, and a main clock signal.

When an image is not displayed on the entire display area AR of the display panel 100, but is displayed only on a portion of the display area AR, the partial display signal PS may transmit a signal to the timing controller 200 indicating a partial display event.

The partial display signal PS may include resolution information of a partial display image. When the partial display signal PS is inputted, the timing controller 200 may generate a lane control signal SCS for controlling a plurality of data lanes that connect the graphic control unit GC and the timing controller 200. The timing controller 200 may output the lane control signal SCS to the external graphic control unit GC. The external graphic control unit GC receiving the lane control signal SCS may deliver a signal to the timing controller 200 by activating some of the plurality of data lanes.

Detailed description for this will be provided later.

The timing controller 200 converts the image data RGB according to (e.g., to match) the specifications of the data driver 400, and outputs the converted image data DATA to the data driver 400. The timing controller 200 generates a gate control signal GS1 and a data control signal DS1. The timing controller 200 outputs the gate control signal GS1 to the gate driver 300, and outputs the data control signal DS1 to the data driver 400.

The gate control signal GS1 is a signal for driving the gate driver 300, and the data control signal DS1 is a signal for driving the data driver 400.

The gate driver 300 generates a gate signal on the basis of the gate control signal GS1, and outputs the gate signal to the gate lines GL1 to GLn. The gate control signal GS1 may include a scan start signal for indicating a scan start, at least one clock signal for controlling an output period of a gate on voltage, and an output enable signal for limiting a duration time of a gate on voltage.

The data driver 400 generates a grayscale voltage according to the converted image data DATA on the basis of the data control signal DS1, and outputs the grayscale voltage as a data voltage to the data lines DL1 to DLm. The data voltage may include a positive data voltage having a positive value with respect to a common voltage, and a negative data voltage having a negative value with respect to a common voltage.

The data control signal DS1 may include a horizontal start signal for notifying that the converted output data DATA starts to be transmitted to the data driver 400, a load signal for applying a data voltage to the data lines DL1 to DLm, and an invert signal for inverting the polarity of a data voltage with respect to a common voltage.

Figure 3:
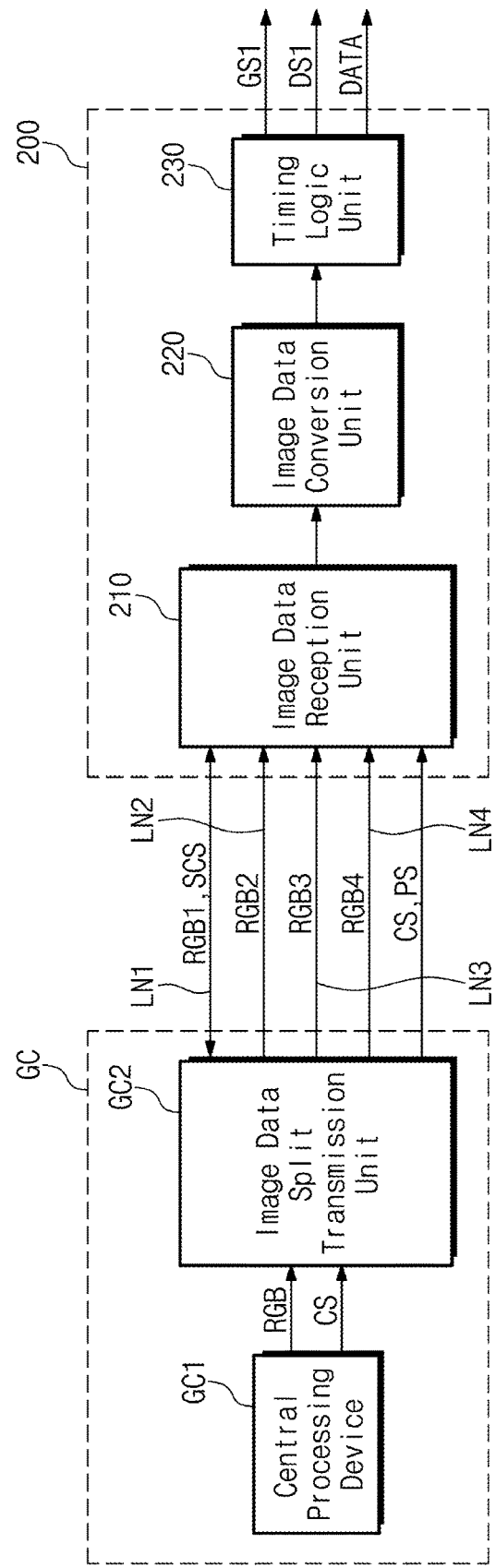
FIG. 3 is an internal block diagram of a graphic control unit and a timing controller according to an embodiment of the inventive concept.

FIG. 3 is an internal block diagram of a graphic control unit (e.g., a graphic controller) and a timing controller, according to an embodiment of the inventive concept.

Referring to FIG. 3, a graphic control unit (e.g., a graphic controller) GC may include a central processing device GC1 and an image data split transmission unit (e.g., an image data split transmitter) GC2.

The central processing device GC1 generates image data RGB and a control signal CS. The central processing device GC1 may be implemented as a central processing unit (CPU) or an application processor (AP), but the inventive concept is not limited thereto.

The central processing device GC1 may output the image data RGB to the image data split transmission unit GC2. The central processing device GC1 may output the control signal CS to the image data split transmission unit GC2. However, the inventive concept is not limited thereto, and according to another embodiment of the inventive concept, the control signal CS may be outputted to the timing controller 200 without passing through the image data split transmission unit GC2.

The image data split transmission unit GC2 may split the image data RGB. For example, the image data split transmission unit GC2 may split the image data RGB into first image data RGB1, second image data RGB2, third image data RGB3, and fourth image data RGB4. That is, the image data split transmission unit GC2 may split the image data RGB received in a serial interface mode, and may transmit the split image data (e.g., RGB1, RGB2, RGB3, and RGB4) to the timing controller 200 as a signal in a parallel interface mode.

The image data split transmission unit GC2 may synchronize the first to fourth image data RGB1, RGB2, RGB3, and RGB4 with a clock signal, and may transmit the synchronized first to fourth image data RGB1, RGB2, RGB3, and RGB4 through first to fourth data lanes LN1, LN2 LN3, and LN4, respectively. While it has been described as an example embodiment that the image data split transmission unit GC2 transmits the image data RGB to the timing controller 200 through four of the first to fourth data lanes LN1, LN2 LN3, and LN4, the inventive concept is not limited thereto. For example, the number of data lanes may vary according to a resolution of the display panel (e.g., 100 of FIG. 2), and/or according to a data transfer rate of the data lanes. Accordingly, the number of data lanes may be less than or greater than four. Additionally, the first to fourth image data RGB1, RGB2, RGB3, and RGB4 may be synchronized with a clock signal transmitted through an additional data lane, or may be synchronized with a clock signal transmitted through the same data lane as that used to transmit one of the first to fourth image data RGB1, RGB2, RGB3, and RGB4.

The timing controller 200 may include an image data reception unit (e.g., an image data receiver) 210, an image data conversion unit (e.g., an image data converter) 220, and a timing logic unit (e.g., a timing logic module) 230.

The image data reception unit 210 may receive a partial display signal PS from the image data split transmission unit GC2 before receiving the first to fourth image data RGB1, RGB2, RGB3, and RGB4. The image data reception unit 210 may detect resolution information of a partial display image from the partial display signal PS. Hereinafter, for convenience of description, the resolution information of the partial display image is referred to as partial resolution information. The image data reception unit 210 may generate a lane control signal SCS for controlling the plurality of data lanes LN1, LN2, LN3, and LN4 on the basis of the partial resolution information.

The lane control signal SCS may include information on the number of activation data lanes. An image data amount when an image is displayed partially may be less than an image data amount when an image is displayed entirely. In this case, when the plurality of data lanes LN1, LN2, LN3, and LN4 are all activated, power consumption may be increased due to standby power when data is not transmitted. However, according to an embodiment of the inventive concept, only one or more desired data lanes (or one or more necessary data lanes) from among the data lanes may be activated (or operated) on the basis of resolution information of a partial display image. For example, all of the data lanes may not be activated based on the resolution information of a partial display image. Accordingly, the increase of power consumption due to standby power for non-operating data lanes may be reduced or prevented. A method of determining the number of activation data lanes will be described below in more detail.

According to an example embodiment, at least one of the plurality of data lanes LN1, LN2, LN3, and LN4, for example, the first data lane LN1, may perform two-way communication. Accordingly, the image data reception unit 210 may provide the lane control signal SCS to the image data split transmission unit GC2 through the first data lane LN1.

The image data split transmission unit GC2 may receive the lane control signal SCS, and may parallelize the image data RGB in correspondence to the number of activation data lanes. For example, when information for activating two data lanes from among the plurality of data lanes LN1, LN2, LN3, and LN4 is included in the lane control signal SCS, the image data split transmission unit GC2 may split the image data RGB into first image data RGB1 and second image data RGB2. Accordingly, the image data RGB (e.g., RGB1 and RGB2) may be outputted to the timing controller 200 through the first data lane LN1 and the second data lane LN2. At this point, data lanes that do not deliver the image data RGB (e.g., RGB3 and RGB4), that is, the third data lane LN3 and the fourth data lane LN4 in this example, may be deactivated. Therefore, power consumption may be reduced.

The image data reception unit 210 receives split image data provided from the image data split transmission unit GC2. When receiving the first to fourth image data RGB1, RGB2, RGB3, and RGB4, the image data reception unit 210 may serialize the received first to fourth image data RGB1, RGB2, RGB3, and RGB4.

The image data reception unit 210 may serialize a data signal received from the image data split transmission unit GC2 on the basis of the lane control signal SCS. As described above, when the image data RGB1 and RGB2 are received through the first data lane LN1 and the second data lane LN2, respectively, the image data reception unit 210 may alternately arrange the sequentially inputted first image data RGB1 and second image data RGB2 and serialize them.

The image data conversion unit 220 converts the image data RGB according to (e.g., to match) the specifications of the data driver 400 (e.g., see FIG. 2), and may output the converted image data DATA to the timing logic unit 230.

The timing logic unit 230 generates a gate control signal GS1 and a data control signal DS1 in response to the control signal CS. Although it is shown in FIG. 3 that the image data conversion unit 220 and the timing logic unit 230 are separated, the image data conversion unit 220 may be included together with the timing logic unit 230.

Figure 4A:
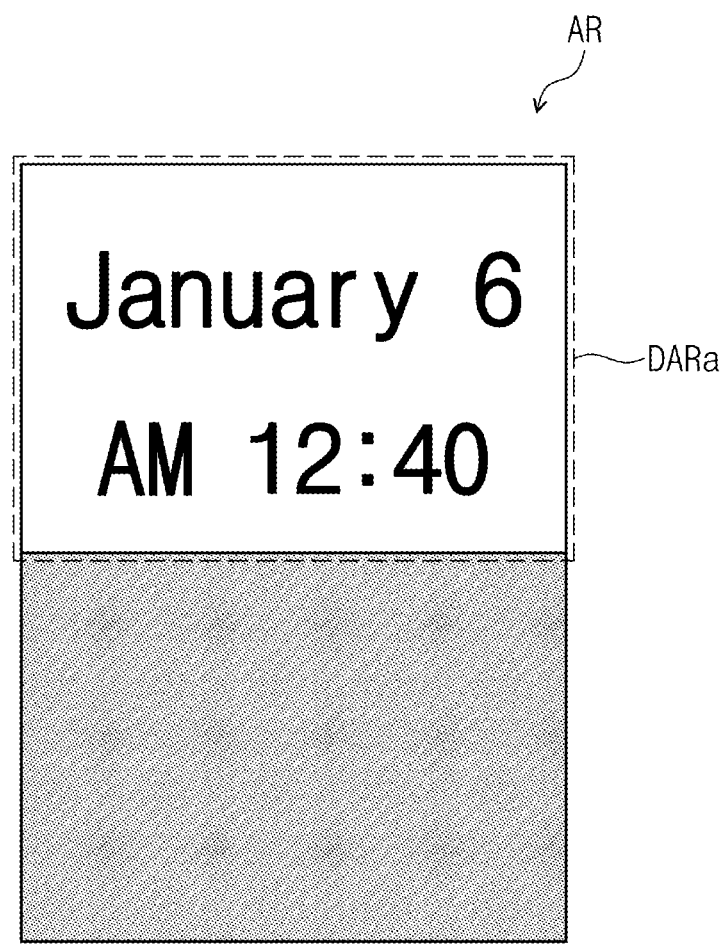
FIG. 4A is a view illustrating operations of a display area according to an embodiment of the inventive concept.
Figure 4B:
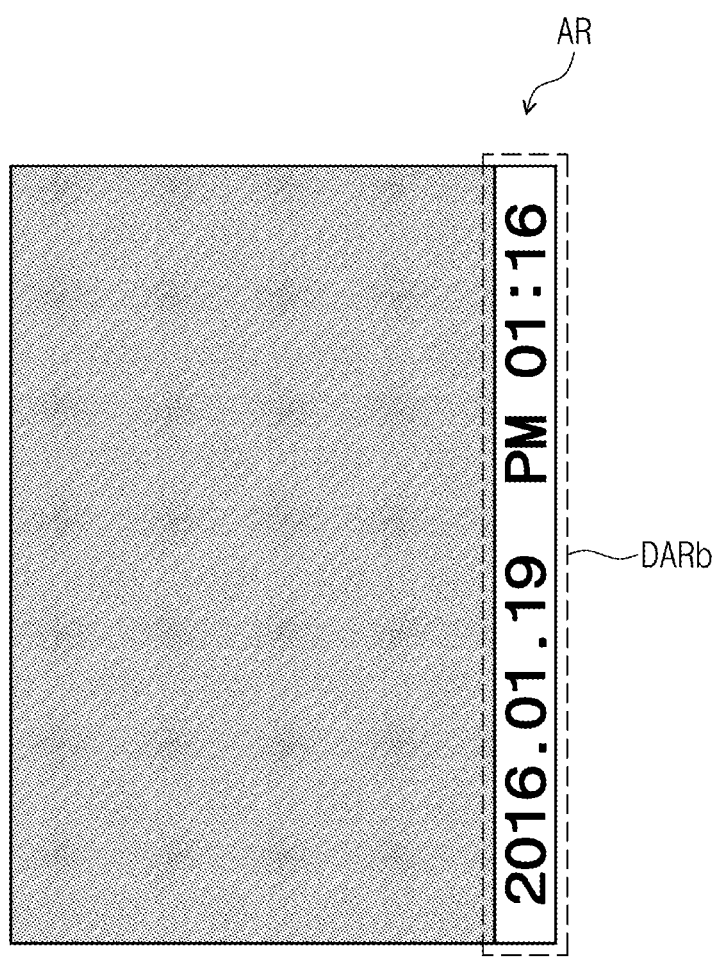
FIG. 4B is a view illustrating operations of a display area according to an embodiment of the inventive concept.

FIG. 4A is an operation diagram of a display area according to an embodiment of the inventive concept, and FIG. 4B is an operation diagram of a display area according to an embodiment of the inventive concept.

Referring to FIGS. 4A and 4B, the full resolution of the display area AR may be, for example, 2560×1440, but the inventive concept is not limited thereto. An image may be displayed on the entire display area AR, but as shown in FIGS. 4A and 4B, an image may be displayed only on a portion of the display area AR. That is, an image may not be displayed on the dark shaded areas of FIGS. 4A and 4B.

Referring to FIG. 4A, an image may be displayed on a portion corresponding to about half of the display area AR. A first portion resolution of an activation display area DARa where an image is displayed may be 1280×1440. Accordingly, when compared to the total data amount of the display area AR on the basis of one frame, the data amount of an image displayed in FIG. 4A may be about half of the total data amount.

Referring to FIG. 4B, an image may be displayed on a portion corresponding to approximately (or about) 1/12 of the display area AR. A second portion resolution of an activation display area DARb where an image is displayed may be 2560×120. Accordingly, when compared to the total data amount of the display area AR on the basis of one frame, the data amount of an image displayed in FIG. 4B may be about 1/12 of the total data amount.

Each of the first to fourth data lanes LN1, LN2, LN3, and LN4 described with reference to FIG. 3 may have two signal lines. Each of the first to fourth data lanes LN1, LN2, LN3, and LN4 may be driven in a lower-power data mode and a high-speed data mode according to a voltage level inputted to each signal line. For example, in the low-power data mode, a ground voltage may be inputted to one of two signal lines, and a high level voltage may be inputted to the other of the two signal lines. Additionally, in the high-speed data mode, a voltage inputted to one of two signal lines and to the other of the two signal lines may have a phase difference of 180°.

Each of the first to fourth data lanes LN1, LN2, LN3, and LN4 may be in a high-speed data mode when the first to fourth image data RGB1, RRGB2, RGB3, and RGB4 are delivered, and may operate in a low-power data mode in a standby state. In the low power data mode, a high level voltage inputted to the other signal line may be 1.2 V, for example.

When an image is displayed partially as shown in FIGS. 4A and 4B, a data amount may be less than the total data amount. Accordingly, while image data is not inputted, a voltage of 1.2 V may be continuously applied to a data lane, and as a result, power consumption may be wasted. However, according to an embodiment of the inventive concept, based on a first portion resolution and a second portion resolution, the number of activation data lanes is calculated, and one or more data lanes other than the activation data lanes are deactivated. Accordingly, because a high level voltage is not applied to the deactivated one or more data lanes, power consumption may be reduced.

Figure 5:
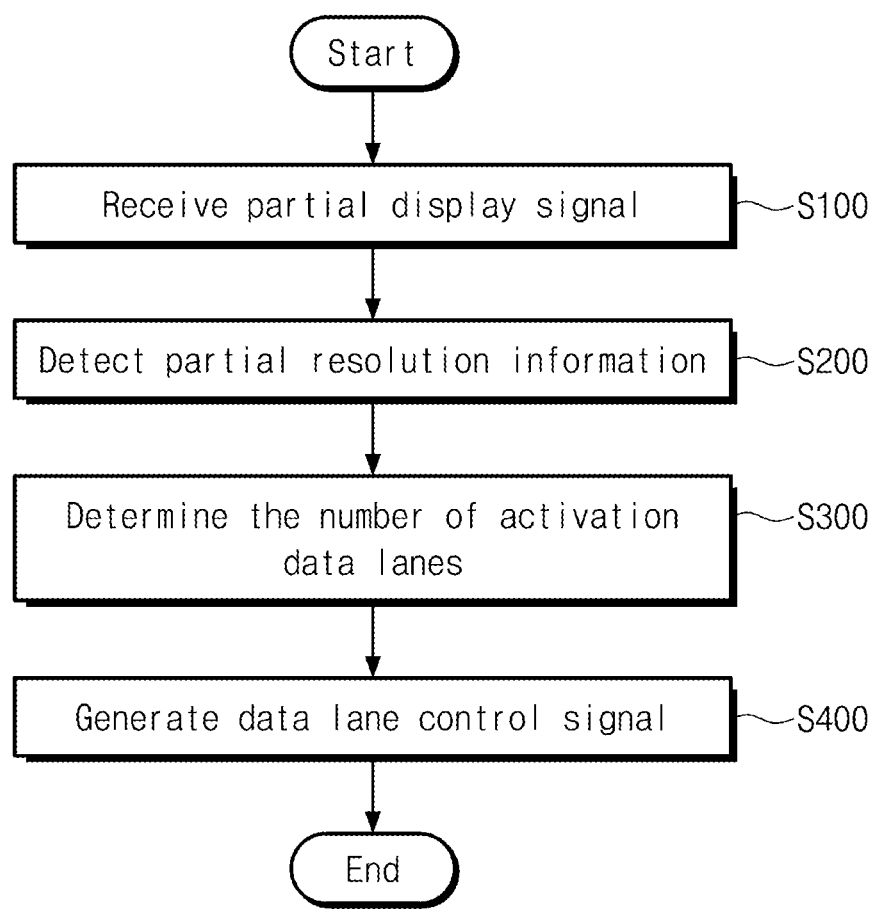
FIG. 5 is a flowchart illustrating an internal operation of a timing controller according to an embodiment of the inventive concept.

FIG. 5 is a flowchart illustrating an internal operation of a timing controller according to an embodiment of the inventive concept.

Referring to FIGS. 3 and 5, the image data reception unit 210 may receive a partial display signal PS from the image data split transmission unit GC2 at operation S100.

The image data reception unit 210 may detect partial resolution information from the partial display signal PS at operation S200. For example, when the image of FIG. 4A is displayed, the first partial resolution may be 1280×1440, and when the image of FIG. 4B is displayed, the second partial resolution may be 2560×120.

The image data reception unit 210 may determine the number of activation data lanes on the basis of the partial resolution information at operation S300. The number of activation data lanes may be a reduced or minimum lane number for delivering image data corresponding to a partial image. There are various methods for determining the number of activation data lanes, which will be described in more detail below.

The image data reception unit 210 may generate the lane control signal SCS including information on the number of activation data lanes at operation S400. The image data reception unit 210 may output the lane control signal SCS to the external graphic control unit GC.

The image data split transmission unit GC2 may split the image data RGB on the basis of the lane control signal SCS, and may transmit the image data RGB (e.g., the split image data) through one or more activated data lanes. Additionally, the image data reception unit 210 may serialize the image data RGB inputted from the outside on the basis of the lane control signal SCS. For example, when two data lanes (for example, the first data lane LN1 and the second data lane LN2) are activated, the image data reception unit 210 may sequentially arrange and serialize the parallelized image data RGB1 and RGB2 inputted alternately through the first data lane LN1 and the second data lane LN2.

Figure 6:
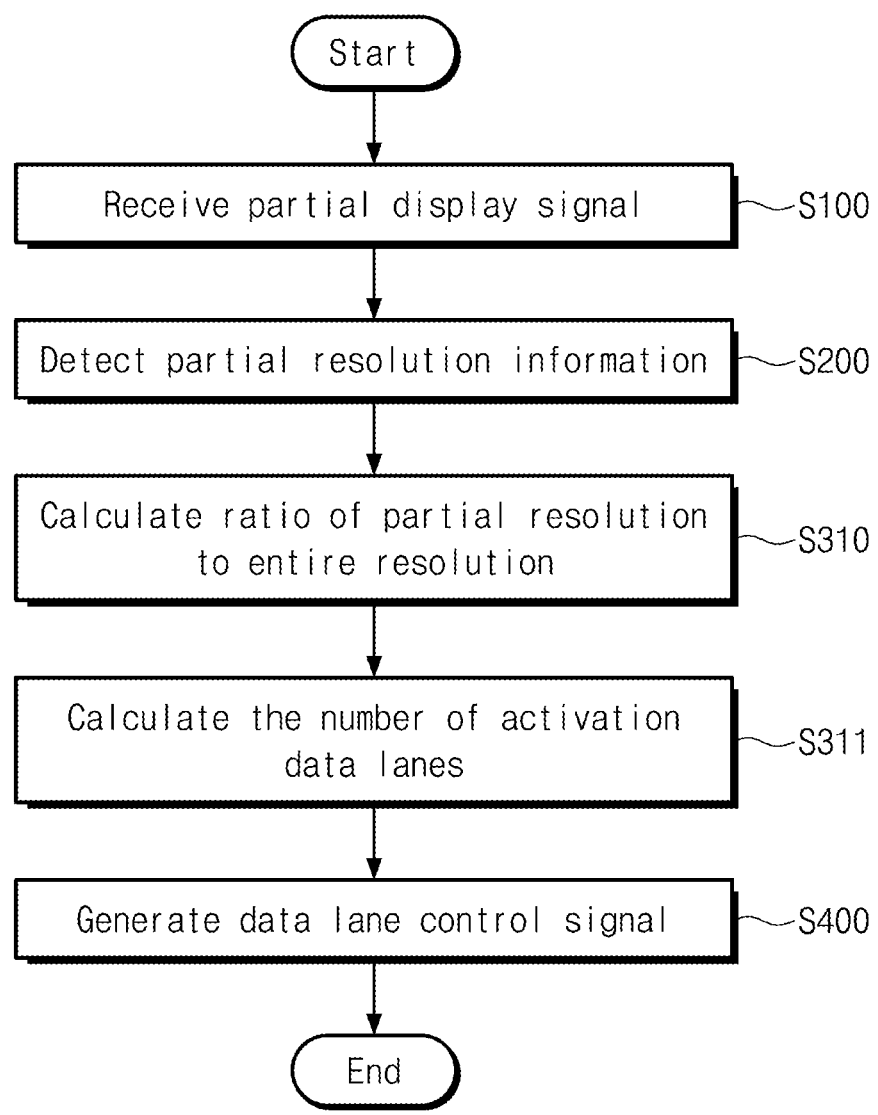
FIG. 6 is a flowchart illustrating an internal operation of a timing controller according to an embodiment of the inventive concept.

FIG. 6 is a flowchart illustrating an internal operation of a timing controller according to an embodiment of the inventive concept.

Referring to FIGS. 3 and 6, an operation for determining the number of activation data lanes is described.

The image data reception unit 210 calculates a ratio (e.g., a partial resolution ratio) of the partial resolution to the full resolution at operation S310. Referring to FIG. 4A, for example, the full resolution may be 2560×1440, and the first portion resolution may be 1280×1440. Accordingly, the first partial resolution ratio in the example of FIG. 4A may be (1280×1440)/(2560×1440)=0.5. Referring to FIG. 4B, for example, the full resolution may be 2560×1440, and the second portion resolution may be 2560×120. Accordingly, the second partial resolution ratio in the example of FIG. 4B may be (2560×120)/(2560×1440)=0.0833.

The image data reception unit 210 may calculate the number of activation data lanes on the basis of the partial resolution ratio at operation S311. For example, the number of data lanes may be calculated based on a value obtained by multiplying the total number of data lanes by the partial resolution ratio.

The value obtained by multiplying the total number of data lanes by the partial resolution ratio is defined as a first value. For example, the total number of data lanes may be equal to four. In the case of FIG. 4A, because 4×0.5=2, the first value may be equal to two, and the total of two data lanes may be activated. In the case of FIG. 4B, the first value is 0.0833×4=0.333. In this case, because the number of activation data lanes should be an integer greater than or equal to one, according to an embodiment of the inventive concept, a number after a decimal point of the first value is rounded up to the nearest integer. Accordingly, a total of one data lane may be activated when the image of FIG. 4B is displayed.

That is, when the first value has a number after a decimal point, the number of activation data lanes may be calculated by rounding up the first value to the nearest integer. For example, when a value obtained by multiplying the set or predetermined number of data lanes by a partial ratio is a value of greater than 1.0 and less than 2.0, the number of activation data lanes may be two.

Figure 7:
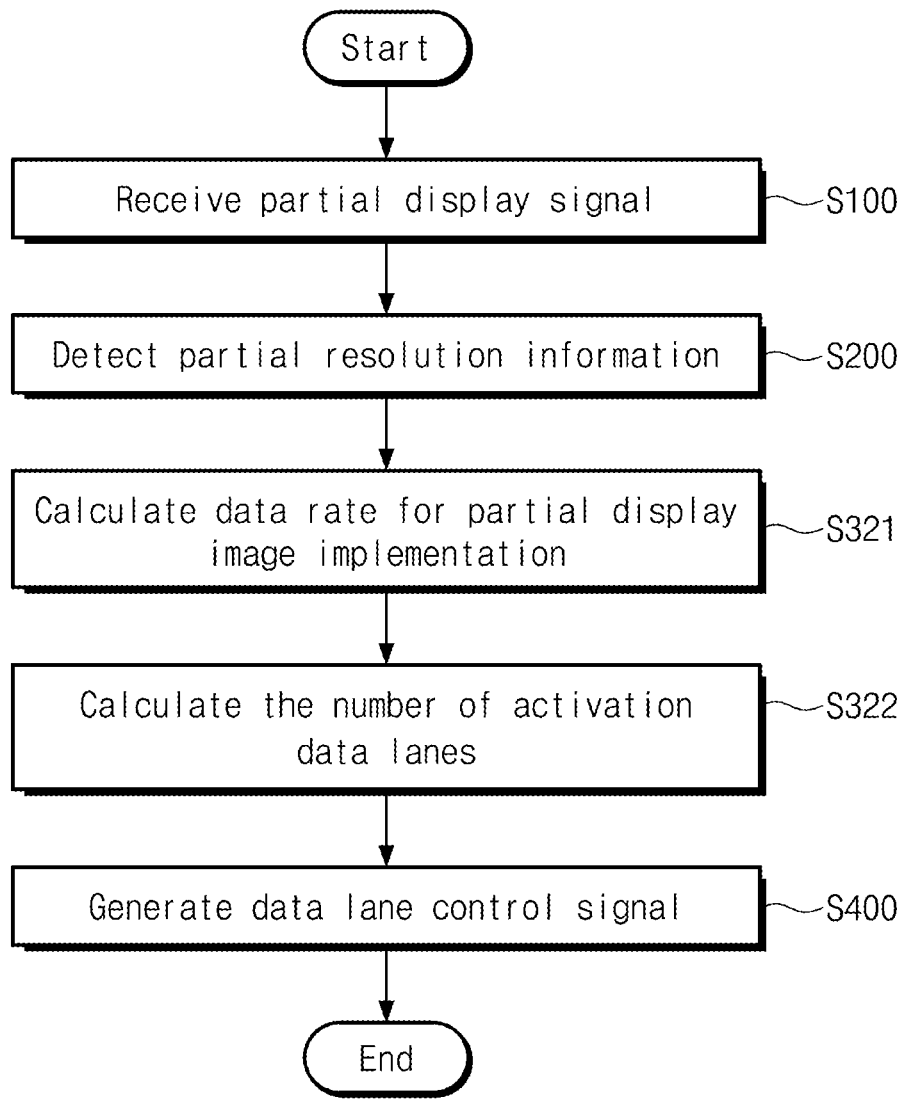
FIG. 7 is a flowchart illustrating an internal operation of a timing controller according to an embodiment of the inventive concept.

FIG. 7 is a flowchart illustrating an internal operation of a timing controller according to an embodiment of the inventive concept.

Referring to FIGS. 3 and 7, an operation for determining the number of activation data lanes is described.

The image data reception unit 210 calculates a data rate for implementing a partial display image at operation S321. In order to calculate the data rate, information on the number of frames displayed in one second and the data amount of each pixel may be utilized. Hereinafter, in order to describe a method of calculating the data rate, it is assumed, for example, that a 60-frame image per second is displayed, each pixel includes three sub pixels, and 8-bit data is utilized to express one sub pixel. However, this is just one example for description purposes, but the inventive concept is not limited thereto. For example, an image of more than or less than 60 frames may be displayed per second, and a sub pixel included in one pixel may be more than or less than three. Additionally, data inputted to each sub pixel may be more than or less than 8 bits.

A first data rate for implementing a partial display image of FIG. 4A may be (1280×1440)×(24bit)×(60 Hz)=2.654 Gbps. Accordingly, in order to implement the partial display image of FIG. 4A, data of more than 2.654 Gbps per second may be received. Additionally, a second data rate for implementing a partial display image of FIG. 4B may be (2560×120)×(24bit)×(60 Hz)=0.442 Gbps. That is, in order to implement the partial display image of FIG. 4B, data of more than 0.442 Gbps per second may be received.

The image data reception unit 210 may calculate the number of activation data lanes on the basis of the data rate for implementing a partial display image at operation S322. The number of activation data lanes may be calculated based on a first value obtained by dividing a data rate for implementing a partial display image by the speed of one data lane. For example, the speed of one data lane may be 1.4 Gbps. However, this is only an example and the inventive concept is not limited thereto. In the case of FIG. 4A, when the first data rate is divided by the speed of one data lane, the first value may be 2.654/1.4=1.895.

The number of activation data lanes may be an integer that is greater than or equal to one. Accordingly, the number of activation data lanes may be calculated by rounding up the first value to the nearest integer. That is, the number of activation data lanes in FIG. 4A may be two. Additionally, in the case of FIG. 4B, the first value may be 0.442/1.4=0.315. Accordingly, the number of activation data lanes in FIG. 4B may be one.

Figure 8:
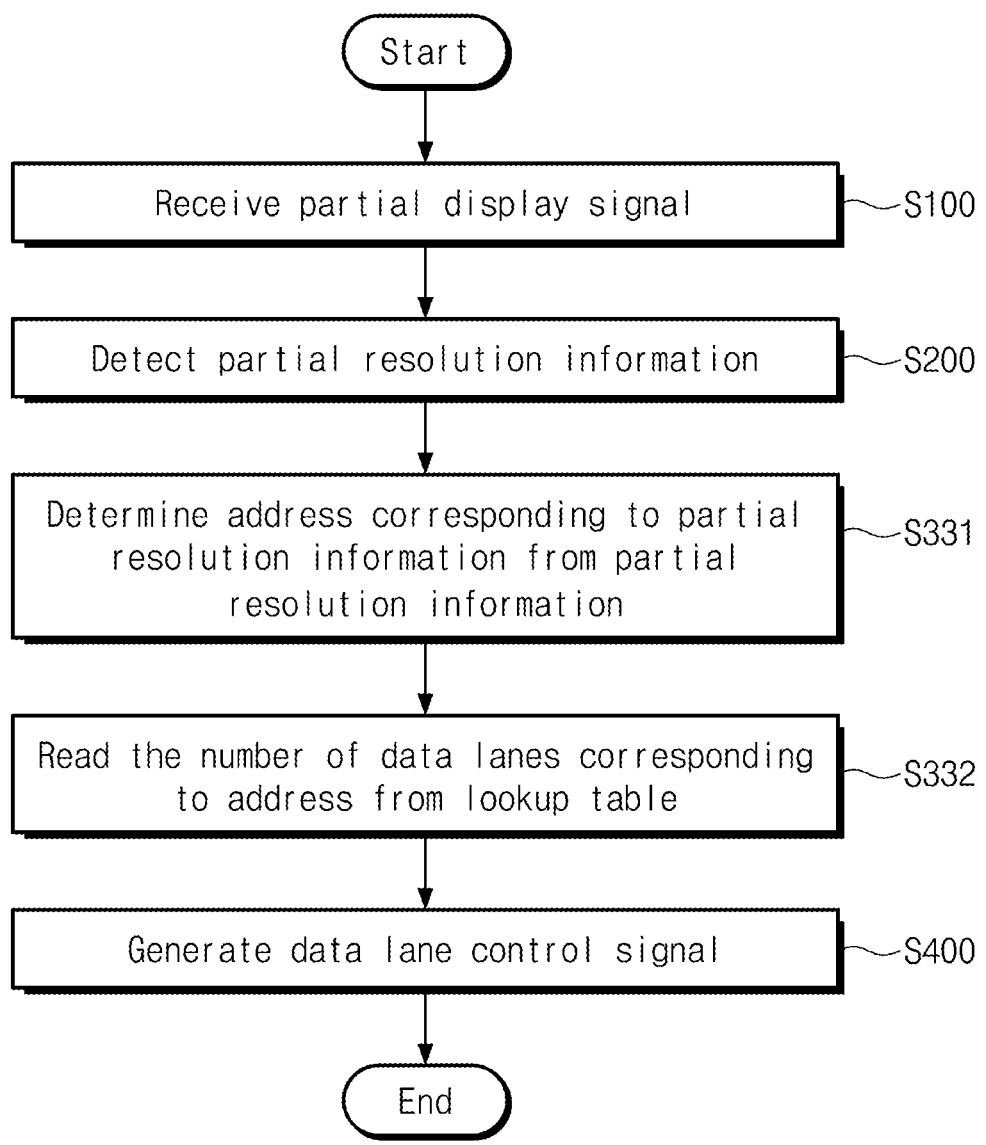
FIG. 8 is a flowchart illustrating an internal operation of a timing controller according to an embodiment of the inventive concept.

FIG. 8 is a flowchart illustrating an internal operation of a timing controller according to an embodiment of the inventive concept.

Referring to FIGS. 3 and 8, an operation for determining the number of activation data lanes is described.

The image data reception unit 210 may include a lookup table. The lookup table may store information on the number of activation data lanes corresponding to partial resolution information.

The image data reception unit 210 may determine an address corresponding to the partial resolution information therefrom at operation S331. The image data reception unit 210 may read the number of activation data lanes corresponding to the determined address from the lookup table at operation S332. Accordingly, the number of activation data lanes may be determined by reducing the number of activation data lanes that are pre-stored in the lookup table, without a separate calculation process.

Figure 9:
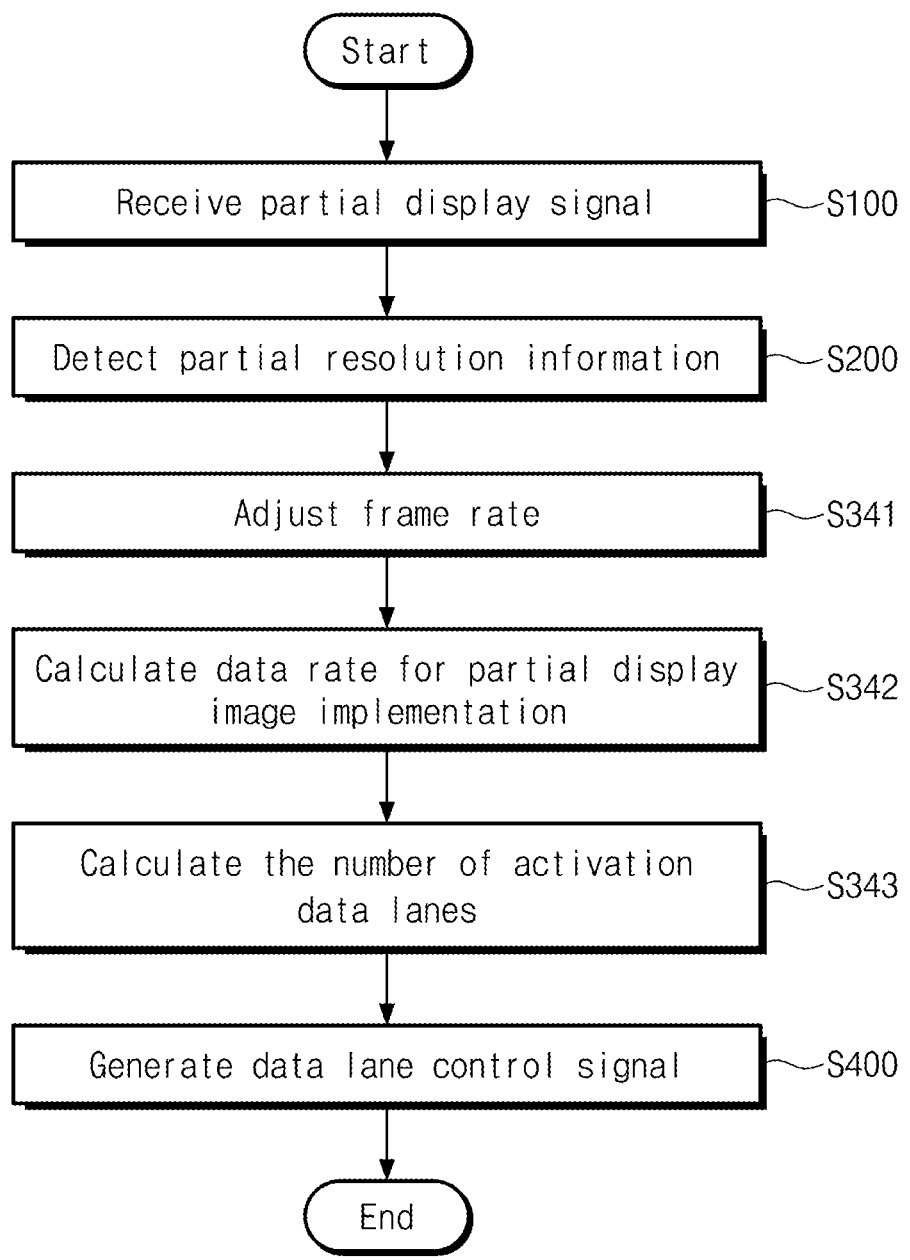
FIG. 9 is a flowchart illustrating an internal operation of a timing controller according to an embodiment of the inventive concept.

FIG. 9 is a flowchart illustrating an internal operation of a timing controller according to an embodiment of the inventive concept.

Referring to FIG. 9, an operation for adjusting a frame rate may be further included at operation S341. When a still image is displayed, the number of frames may be reduced compared to when a video (or moving image) is expressed or a screen is changed (e.g., continuously changed). For example, when the partial image (e.g., time and/or date) is displayed as shown in FIG. 4A or 4B, the number of frames displayed per second may be reduced by at least half (e.g., about half or more than half).

The image data reception unit 210 may calculate a data rate for implementing a partial display image by applying the adjusted frame rate at operation S342. For example, referring to FIG. 4A, the frame rate may be reduced in half. In this case, the frame rate may be reduced to 30 Hz. Accordingly, a data rate utilized for a partial resolution may be (1280×1440)×(24bit)×(30 Hz)=1.327 Gbps, and the number of activation data lanes may be 1.327/1.4=0.947, which is round up to one. Compared to the example embodiment of FIG. 7, even when the same partial resolution information is provided, the number of activation data lanes may be further reduced through the adjustment of the frame rate.

Figure 10:
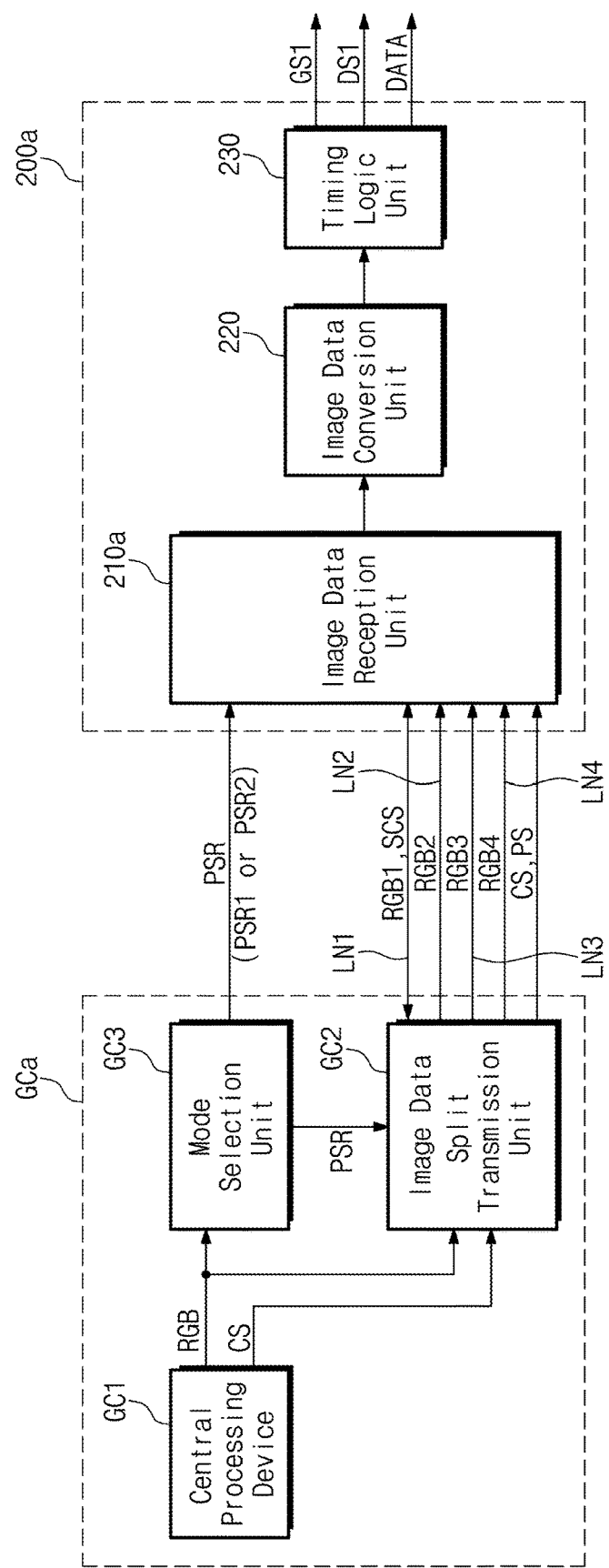
FIG. 10 is an internal block diagram of a graphic control unit and a timing controller according to an embodiment of the inventive concept.

FIG. 10 is an internal block diagram of a graphic control unit (e.g., a graphic controller) and a timing controller according to an embodiment of the inventive concept. Hereinafter, differences between FIG. 10 compared to FIG. 3 will be mainly described, and thus, portions previously described with reference to FIG. 3 may not be repeated.

Referring to FIG. 10, a graphic control unit (e.g., a graphic controller) GCa may include a central processing device (e.g., a central processor) GC1, an image data split transmission unit (e.g., an image data split transmitter) GC2, and a mode selection unit (e.g., a mode selector) GC3.

The central processing device GC1 may output the image data RGB to the image data split transmission unit GC2 and to the mode selection unit GC3.

The mode selection unit GC3 receives the image data RGB from the central processing device GC1. The mode selection unit GC3 outputs a mode selection signal PSR to the image data split transmission unit GC2 and to the timing controller 200a, by comparing first image data corresponding to the nth frame and second frame image data corresponding to the n+1th frame (where n is a natural number greater than or equal to 1).

When the first frame image data and the second frame image data are the same or substantially the same, the mode selection unit GC3 determines that the received image data RGB is a still image, and outputs a first mode selection signal PSR1 as the mode selection signal PSR including information on a first mode, that is, a still image mode. When the first frame image data and the second frame image data are different from each other, the mode selection unit GC3 determines that the received image data RGB is a video (e.g., a moving image), and outputs a second mode selection signal PSR2 as the mode selection signal PSR including information on a second mode, that is, a video mode.

The image data split transmission unit GC2 may receive the mode selection signal PSR (e.g., PSR1 or PSR2) from the mode selection unit GC3, and in response to the mode selection signal PSR, may output the image data RGB (e.g., RGB1, RGB2, RGB3, and/or RGB4) to the timing controller 200a.

For example, when receiving the first mode selection signal PSR1 as the mode selection signal PSR, the image data split transmission unit GC2 may stop operating. That is, the image data split transmission unit GC2 may not provide the image data RGB to the timing controller 200a. When receiving the second mode selection signal PSR2 as the mode selection signal PSR, the image data split transmission unit GC2 may transmit the image data RGB to the timing controller 200a. That is, when the first frame image data corresponding to the nth frame and the second frame image data corresponding to the n+1th frame are the same or substantially the same, the image data split transmission unit GC2 may stop operating, so that as a result, power consumption may be reduced.

The image data reception unit 210a may include a memory (e.g., a memory device). The memory may store data corresponding to one frame. The memory may include a volatile memory device, such as DRAM, and/or a non-volatile memory device, such as flash memory. For example, the memory may be configured with DRAM, PRAM, MRAM, ReRAM, FRAM, NOR flash memory, NAND flash memory, and/or fusion flash memory (for example, memory including a combined NAND flash memory and NOR interface logic). However, the inventive concept is not limited thereto.

During the nth frame, the image data reception unit 210a receives the second mode selection signal PSR2 as the mode selection signal PSR and the image data RGB. Because the second mode selection signal PSR2 is inputted to the image data reception unit 210a, the first frame image data may be stored in the memory.

During the n+1th frame, the image data reception unit 210a may receive the first mode selection signal PSR1 as the mode selection signal PSR. At this time, because the image data split transmission unit GC2 stops its operation by the first mode selection signal PSR1, the image data reception unit 210a may not receive the image data RGB inputted to the image data split transmission unit GC2 during the n+1th frame. However, in this case, the first frame image and the second frame image data corresponding to the nth frame and the n+1th frame are the same or substantially the same. Accordingly, the timing controller 200a may output converted image data DATA corresponding to the first frame image data stored in the memory during the n+1th frame. This is referred to as a panel self-refresh function.

According to an embodiment, in relation to the image display system, the image data reception unit 210a may perform one of the operations described with reference to FIGS. 6 to 9 in addition to the panel self-refresh function. When receiving a partial display signal, the image data reception unit 210a may activate only some of the plurality of data lanes LN1, LN2, LN3, and LN4, and may receive image data through the activated data lane(s). Accordingly, the other remaining data lanes, except for the activated data lane(s), may be deactivated. As a result, power waste by a standby voltage of the data lanes may be prevented or reduced.

According to one or more embodiments of the inventive concept, based on partial resolution information, the number of activation data lanes is calculated, and other data lanes, except for the activation data lanes, are deactivated. Accordingly, because a high level voltage is not applied to the deactivated data lanes, power consumption may be reduced.

The electronic or electric devices and/or any other relevant devices or components according to embodiments of the inventive concept described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the inventive concept.

Although exemplary embodiments of the present invention have been described, it is understood that the present invention is not limited to these exemplary embodiments, but that various changes and modifications can be made by one having ordinary skill in the art within the spirit and scope of the present invention as defined in the following claims and their equivalents.

What is claimed is:

1. A driving method of a display device, the method comprising:
    receiving, by a timing controller, a partial display signal from a graphic controller;
    detecting partial resolution information from the partial display signal;
    determining a number of activation data lanes from among a plurality of data lanes based on the partial resolution information;
    generating a lane control signal including information on the number of activation data lanes;
    outputting, by the timing controller, the lane control signal to the graphic controller; and
    receiving image data through the activation data lanes from among the plurality of data lanes from the graphic controller.

2. The method of claim 1, wherein the determining of the number of activation data lanes comprises:
    calculating a ratio of a partial resolution to an entire resolution;
    calculating a first value by multiplying the ratio by an entire number of the plurality of data lanes; and
    calculating the number of the activation data lanes by rounding up the first value to a nearest integer.

3. The method of claim 1, wherein the determining of the number of the activation data lanes comprises:
    calculating a data rate for a partial display image implementation based on the partial resolution information;
    calculating a first value by dividing the data rate by a speed of one data lane from among the plurality of data lanes; and
    calculating the number of the activation data lanes by rounding up the first value to a nearest integer.

4. The method of claim 1, wherein the determining of the number of the activation data lanes comprises:
    determining an address value corresponding to the partial resolution information based on the partial resolution information; and
    reading the number of the activation data lanes corresponding to the address value from a lookup table.

5. The method of claim 1, further comprising adjusting a frame rate for a number of frames displayed for 1 second.

6. The method of claim 5, further comprising determining the number of the activation data lanes after adjusting the frame rate for the number of frames displayed for 1 second.

7. The method of claim 1, further comprising receiving one of a first mode selection signal corresponding to a still image mode or a second mode selection signal corresponding to a video mode from the graphic controller,
    wherein, when the second mode selection signal is received, the image data is received from the graphic controller.

8. A display device comprising:
    a timing controller configured to receive a partial display signal including partial resolution information from a graphic controller through one of a plurality of data lanes, and to determine a number of activation data lanes from among the plurality of data lanes based on the partial resolution information; and
    a display panel configured to be controlled by the timing controller,
    wherein the timing controller is further configured to generate a lane control signal including information on the number of the activation data lanes, to output the generated lane control signal to the graphic controller, and to receive image data from the graphic controller through the activation data lanes.

9. The display device of claim 8, wherein the timing controller is configured to calculate a ratio of a partial resolution to an entire resolution, to calculate a first value by multiplying the ratio by an entire number of the plurality of data lanes, and to round up the first value to a nearest integer to determine the number of the activation data lanes.

10. The display device of claim 8, wherein the timing controller is configured to calculate a data rate for a partial display image implementation based on the partial resolution information, to calculate a first value by dividing the data rate by a speed of one data lane from among the plurality of data lanes, and to determine the number of the activation data lanes by rounding up the first value to a nearest integer.

11. The display device of claim 10, wherein the timing controller is configured to calculate the data rate after adjusting a number of frames displayed for 1 second.

12. The display device of claim 8, wherein the timing controller is configured to determine an address value corresponding to the partial resolution information, and to read the number of the activation data lanes corresponding to the address value from a lookup table to determine the number of the activation data lanes.

13. The display device of claim 8, wherein the timing controller is configured to receive a mode selection signal from the graphic controller including information on one of a first mode corresponding to a still image mode or a second mode corresponding to a video mode,
    wherein the timing controller is configured to receive the image data from the graphic controller when the mode selection signal including the information on the second mode is received.

14. The display device of claim 8, wherein at least one of the plurality of data lanes is a two-way communication lane configured to deliver a signal from the graphic controller to the timing controller and from the timing controller to the graphic controller.

15. An image display system comprising:
    a display panel comprising a plurality of data lines, a plurality of gate lines, and a plurality of pixels;
    a graphic controller configured to output image data, and a partial display signal including partial resolution information;
    a timing controller connected to the graphic controller through a plurality of data lanes, the timing controller being configured to receive the image data and the partial display signal, and to output a gate control signal, a data control signal, and converted image data;
    a gate driver configured to generate a gate signal based on the gate control signal, and to output the gate signal to the gate lines; and
    a data driver configured to output a data voltage to the data lines, the data voltage being obtained by converting the converted image data based on the data control signal,
    wherein the timing controller comprises an image data receiver configured to determine a number of activation data lanes from among the plurality of data lanes based on the partial resolution information, to generate and output a lane control signal including information on the number of the activation data lanes to the graphic controller, and to receive the image data through the activation data lanes.

16. The image display system of claim 15, wherein the graphic controller comprises:
   a central processor configured to generate the image data; and
   an image data split transmitter configured to receive the image data from the central processor, to split the image data according to the lane control signal received from the image data receiver, and to output a split image data through the activation data lanes.

17. The image display system of claim 16, wherein the graphic controller further comprises a mode selector configured to compare first frame image data corresponding to an nth frame and second frame image data corresponding to an n+1th frame, where n is an integer greater than or equal to one, according to the image data received from the central processor, to generate a mode selection signal including information on one of a first mode corresponding to a still image mode or a second mode corresponding to a video mode, and to output the mode selection signal to the image data split transmitter and to the image data receiver,
   wherein the image data split transmitter is configured to stop operating when the mode selection signal including the information on the first mode is received, and to provide the image data to the timing controller when the mode selection signal including the information on the second mode is received.

18. The image display system of claim 15, wherein the image data receiver is configured to calculate a ratio of a partial resolution to an entire resolution, to calculate a first value by multiplying the ratio by an entire number of the plurality of data lanes, and to round up the first value to a nearest integer to calculate the number of the activation data lanes.

19. The image display system of claim 15, wherein the image data receiver is configured to calculate a data rate for a partial display image implementation based on the partial resolution information, to calculate a first value by dividing the data rate by a speed of one data lane from among the plurality of data lanes, and to calculate the number of the activation data lanes by rounding up the first value to a nearest integer.

20. The image display system of claim 15, wherein the image data receiver is configured to determine an address value corresponding to the partial resolution information based on the partial resolution information, and to read the number of the activation data lanes corresponding to the address value from a lookup table.

* * * * *